May 31, 1966 A. E. WHITECAR 3,253,382
TONGUE INSERTING MACHINE
Filed Dec. 24, 1962 10 Sheets-Sheet 1

INVENTOR.
ALTEN E. WHITECAR
BY
ATTORNEYS

May 31, 1966  A. E. WHITECAR  3,253,382
TONGUE INSERTING MACHINE
Filed Dec. 24, 1962  10 Sheets-Sheet 3

INVENTOR.
ALTEN E. WHITECAR
BY
ATTORNEYS

INVENTOR.
ALTEN E. WHITECAR

May 31, 1966 A. E. WHITECAR 3,253,382
TONGUE INSERTING MACHINE
Filed Dec. 24, 1962 10 Sheets-Sheet 5

INVENTOR.
ALTEN E. WHITECAR
BY
ATTORNEYS

May 31, 1966    A. E. WHITECAR    3,253,382
TONGUE INSERTING MACHINE
Filed Dec. 24, 1962    10 Sheets-Sheet 6

INVENTOR.
ALTEN E. WHITECAR
BY
ATTORNEYS

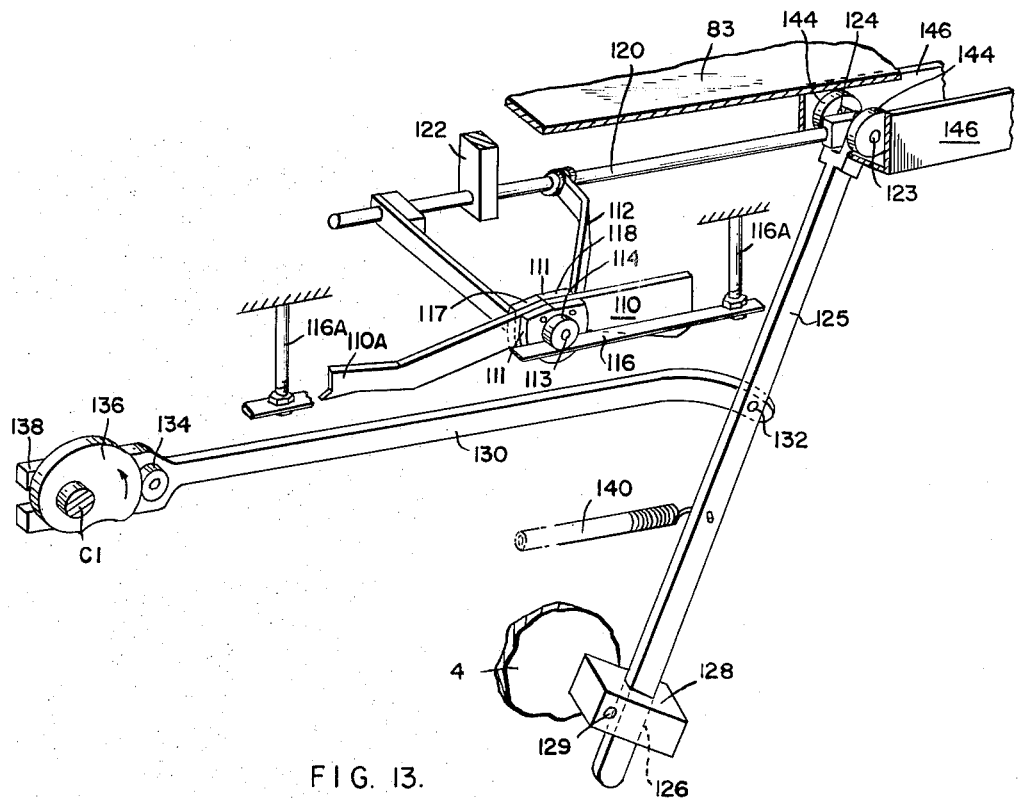
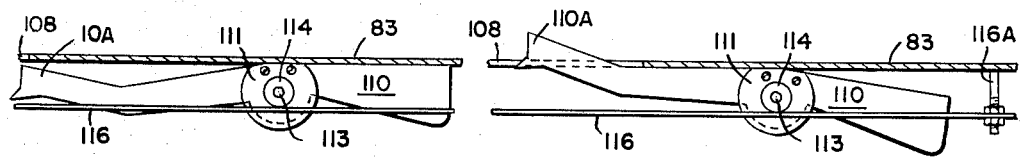
FIG. 13.   FIG. 14.   FIG. 15.

May 31, 1966 A. E. WHITECAR 3,253,382
TONGUE INSERTING MACHINE
Filed Dec. 24, 1962 10 Sheets-Sheet 10

INVENTOR.
ALTEN E. WHITECAR
BY
ATTORNEYS

United States Patent Office 3,253,382
Patented May 31, 1966

3,253,382
TONGUE INSERTING MACHINE
Alten E. Whitecar, Westville, N.J., assignor to Smith Kline & French Laboratories, Philadelphia, Pa., a corporation of Pennsylvania
Filed Dec. 24, 1962, Ser. No. 246,790
14 Claims. (Cl. 53—50)

This invention relates to a tongue inserting machine and more particularly relates to a machine for inserting a tongue in the open end of a packed container.

The machine of this invention is of particular utility for inserting a tongue into a sleeve type container of the type employed in the pharmaceutical industry to carry a physician's sample of a drug normally contained in a cutout frame. Such being an important and typical application, the machine of the invention will be described in connection therewith without intending any limitation thereby.

This and other objects of the invention will be made fully apparent from a reading of the following description in conjunction with the drawings in which:

FIGURE 13 is a top perspective view partially broken away of the means to advance the package from the conveyor shown in FIGURE 10;

FIGURE 14 is a vertical section showing a detail of the advancing means of FIGURE 13 in the retracted position;

FIGURE 15 is a vertical section showing the advancing means detail of FIGURE 14 in the partially advanced position;

Figure 1:
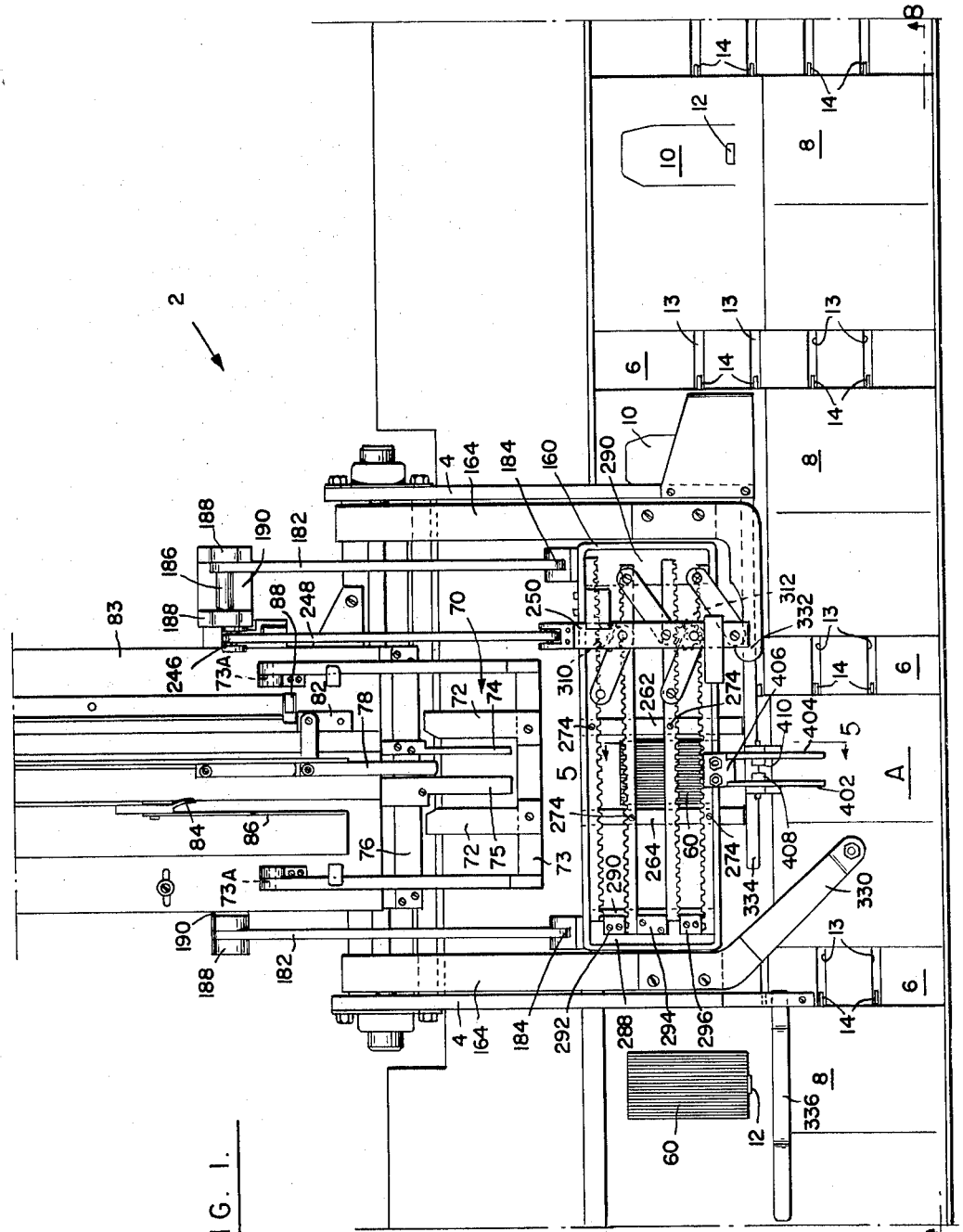
FIGURE 1 is a plan view of a machine in accordance with the invention showing the machine carriage in its forward position just after the package was released.
Figure 9:
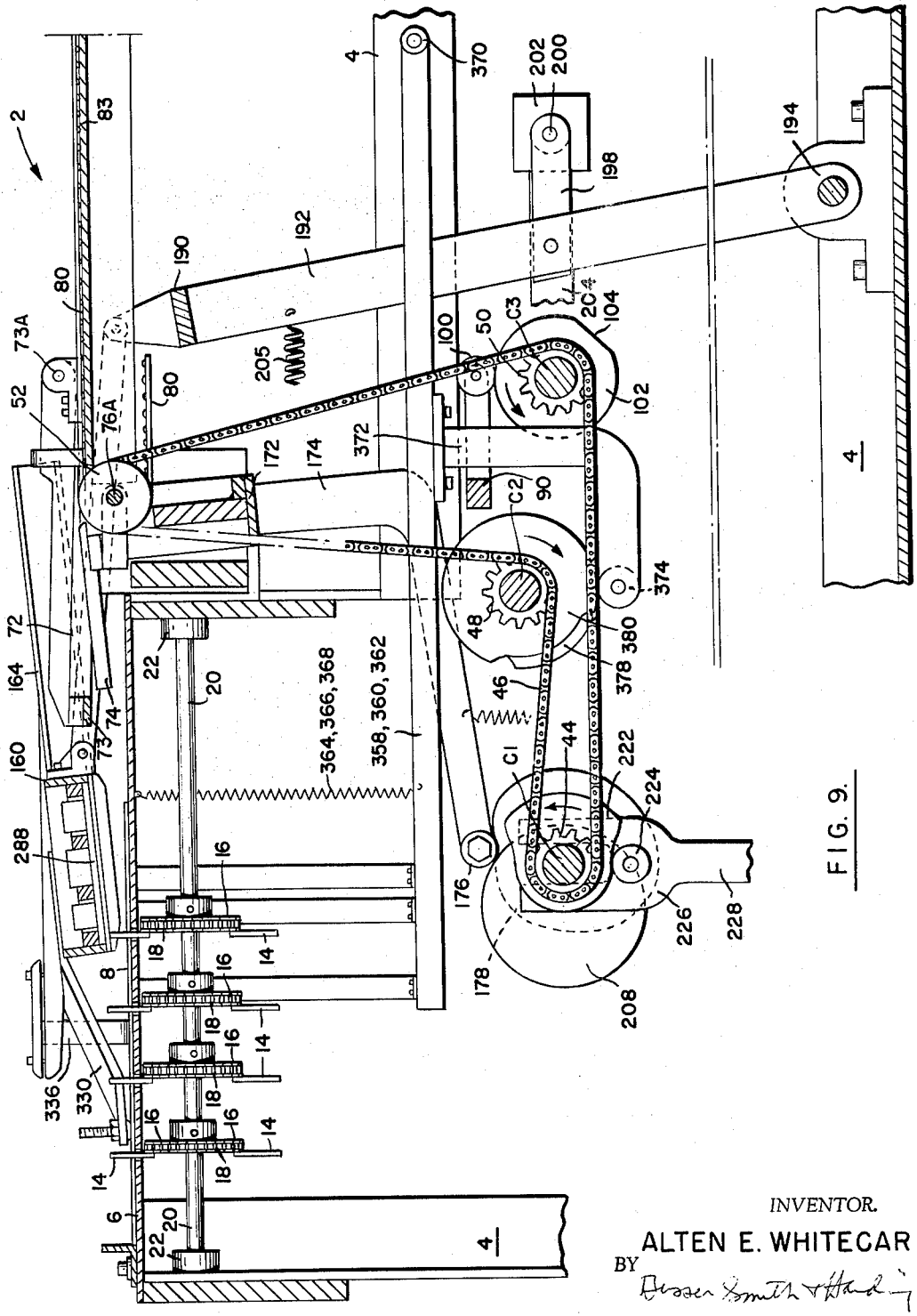
FIGURE 9 is a vertical section taken on the plane indicated by the line 9—9 in FIGURE 8.

Referring first to FIGURES 1 and 9, an inserting machine 2 in accordance with the invention has a frame 4 which supports a fixed conveying table 6 on which it conveys a brochure 8 having a tongue 10 and a tab 12 at the base of the tongue. Conveying surface 6 is provided with slots 13 for the accommodation of fingers 14 secured to chains 16 carried by sprockets 18 fixedly secured to shaft 20 which is freely rotatable in bearings indicated at 22, 22. Fingers 14 on chain 16 are advanced intermittently to provide for a dwell period at inserting station indicated generally at A. Such stepping conveyors are well-known in the art and hence details of the stepping drive for the conveyor are not shown. Conventionally, a Geneva mechanism or a crank and ratchet drive is employed to provide intermittent motion.

Figure 8:
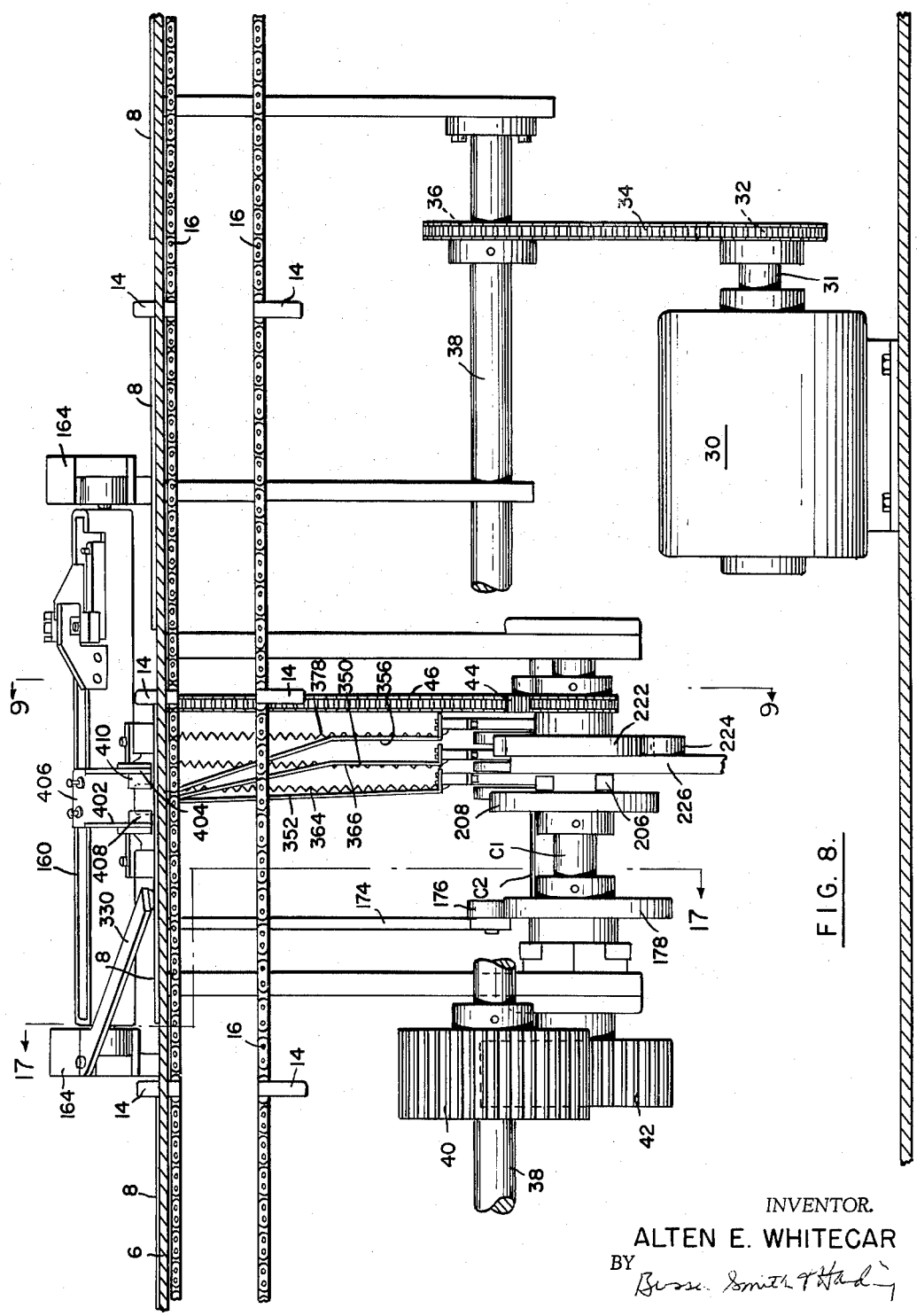
FIGURE 8 is a vertical section taken on the plane indicated by the line 8—8 in FIGURE 1.

The basic drive for the machine 2 will now be described to provide proper orientation for the further description. As shown in FIGURE 8, an electric motor 30 drives a sprocket 32 which in turn drives a chain 34 which drives a sprocket 36 fixedly secured to a shaft 38. Shaft 38 drives a crank and ratchet drive (not shown) which drives conveyor chains 16. The rotation of shaft 38 rotates gear 40 which engages gear 42 secured to cam shaft C1 to rotate cam shaft C1 counterclockwise as viewed in FIGURE 9. Cam C1 has secured thereto a sprocket 44 which, as best seen in FIGURE 9, drives a chain 46 which engages sprockets 48 and 50 to drive respectively cam shafts C2 and C3. Chain 46 also engages sprocket 52. The basic movements of the inserting operation are controlled by cam shafts C1, C2, and C3, which rotate at the same rate, and their associated mechanisms.

Figure 4:
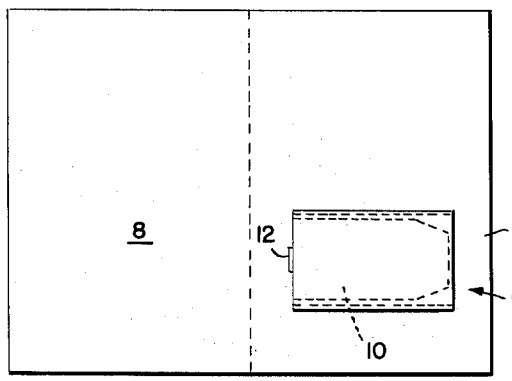
FIGURE 4 is a plan view of a brochure having a tongue for insertion in the sleeve and frame assembly of FIGURE 3.
Figure 3:
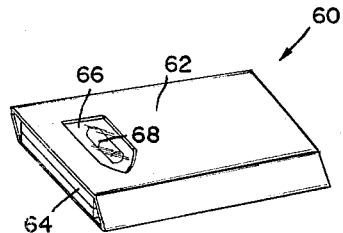
FIGURE 3 is a side perspective view of a sleeve and frame assembly of the type suitable for use with the machine of the invention.
Figure 6:
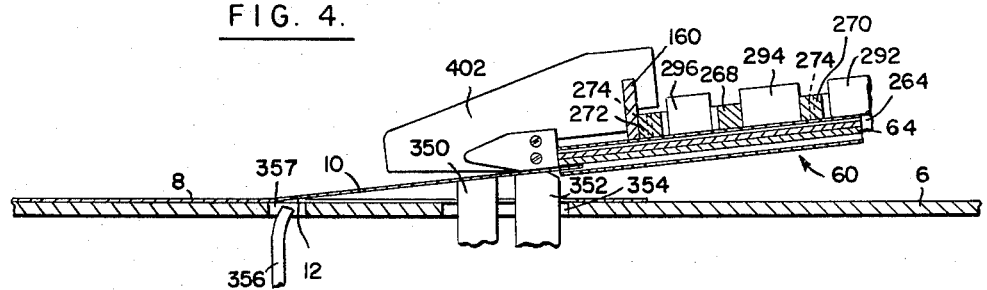
FIGURE 6 is a vertical section through the compression means similar to that of FIGURE 5 but showing the compression means at the position where a tongue is just entering the sleeve and frame assembly.
Figure 7:
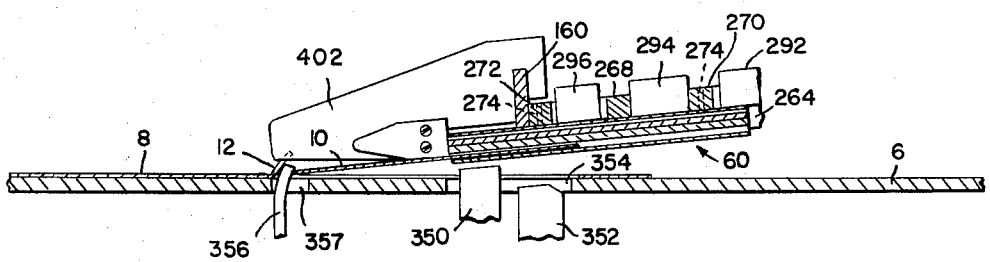
FIGURE 7 is a vertical section through the compression means similar to that of FIGURES 5 and 6 showing a still further advance of the tongue into the sleeve and frame assembly.

Referring to FIGURE 3, an open ended package 60 into which tongue 10 of brochure 8 is to be inserted comprises a parallelogram in cross section sleeve 62 of cardboard or the like and a folded frame 64 which contains plastic packeted capsules indicated at 66 and visible through an opening 68 in sleeve 62. Package 60 is a conventional package used widely for the shipment of physicians' samples with sleeve 62 not fully opened to the squared position in order to hold the frame 64 which is not as wide as the interior of sleeve 62. The purpose of the machine 2 is to insert the tongue 10 between the lower inner face of sleeve 62 and frame 64 with tab 12 abutting the end of sleeve 62 adjacent the base of the tongue to limit the travel of the frame 64, as shown in FIGURE 4.

Referring now to FIGURES 1, 10 and 18–20, a package receiver 70 is provided with spaced arms 72 secured to a U-frame 73 which is pivoted at 73a, 73a so as to be free to permit the movement of arms 72 downwardly.

Figure 18:
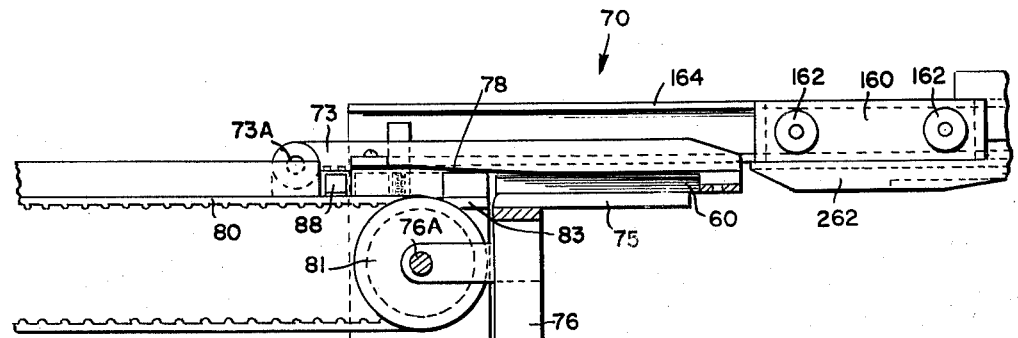
FIGURE 18 is a vertical section showing the package receiver.
Figure 19:
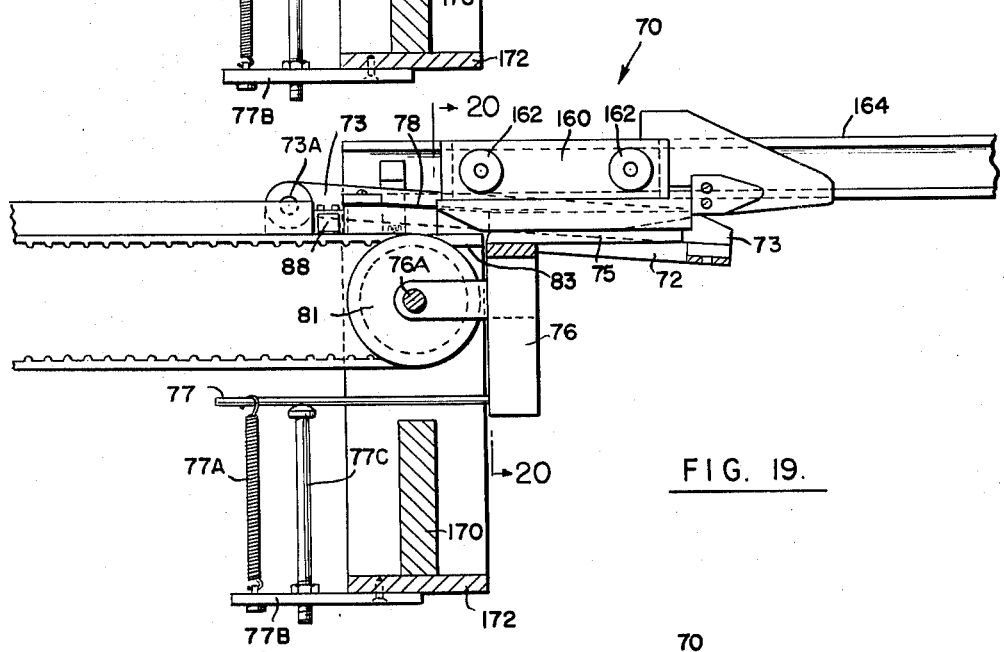
FIGURE 19 is the structure of FIGURE 18 showing the receiver cammed by the carriage.
Figure 20:
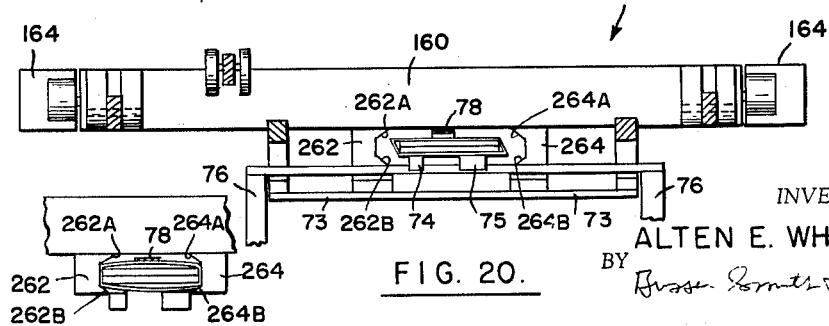
FIGURE 20 is a vertical section taken in the plane indicated by the line 20—20 in FIGURE 19.

Support fingers 74 and 75 (FIGURE 1) are secured to a frame 76 pivotally secured to a shaft 76a (FIGURE 18). Frame 76 has secured thereto a bar 77. An extension spring 77A is connected at one end to bar 77 and at the other end to a bar 77B fixedly secured to a member 172 to be described later. A bolt 77C is secured to bar 77B and is adapted to abut against bar 77.

A leaf spring 78 (FIGURES 1 and 20) acts to hold down package 60 when in receiver 70.

Figure 10:
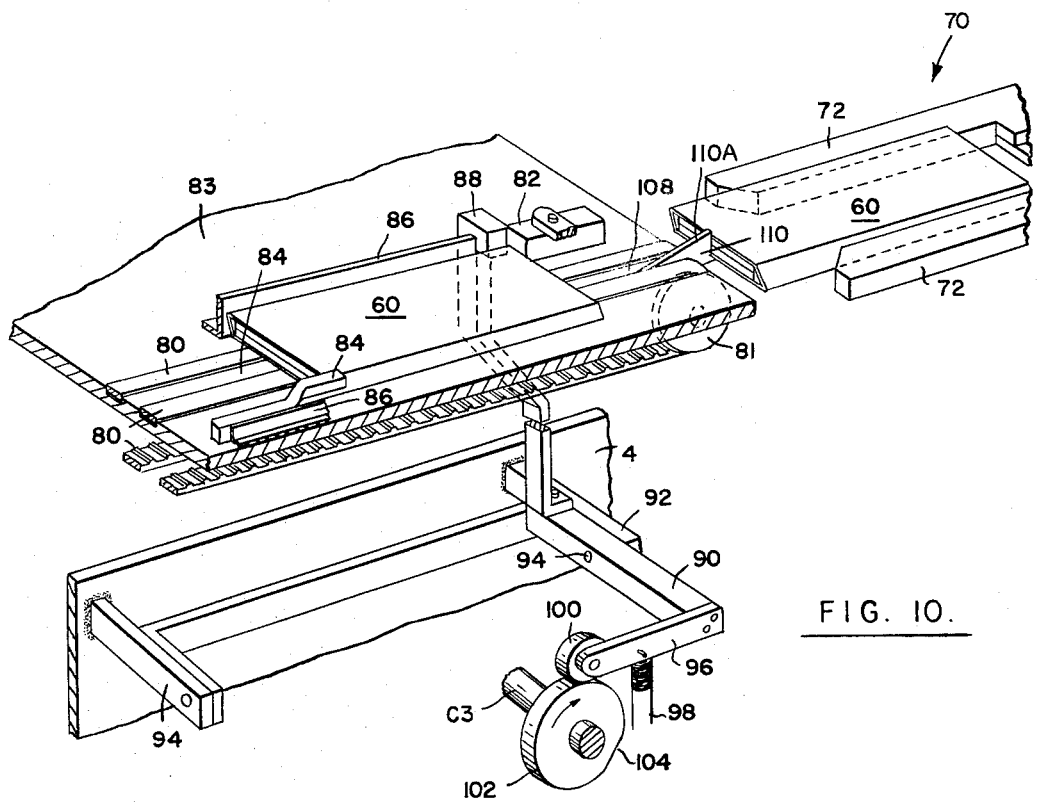
FIGURE 10 is a top perspective view partially broken away showing the sleeve feeding structure of the machine of FIGURE 1.
Figure 12:
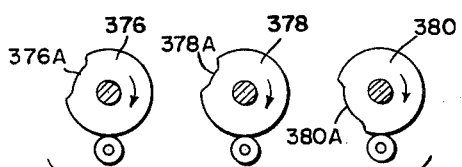
FIGURE 12 is a lay-out of the cams employed in the apparatus shown in FIGURE 11.

Referring to FIGURE 10, continuously moving conveyor belts 80, 80 carried by pulleys 81, 81 on shaft 76A which is driven by sprocket 52 (FIGURE 9) provide a supply of packages 60 with the leading package abutting against stop 82, a guide 84 urging container 60 against the rail 86 which is adjacent stop 82 to insure contact with the stop. A finger 88 is adapted to be urged towards the package 60 to move it clear of stop 82 and permit it to be carried forward by conveyor belts 80, 80.

Finger 88 is secured to one end of lever 90 which is pivotally secured to bracket 92 at 94. Lever 90 is fixedly secured to lever 96 which is biased downwardly by an extension spring indicated at 98 carrying a cam follower roller 100 which is in engagement with a cam 102 fixedly secured to cam shaft C3. Cam 102 has a low portion 104 which when it is engaged by roller 100 permits spring 98 to spring lever 96 downwardly to pivot lever 90 about the pivot point at 94 causing finger 88 to move towards the adjacent package 60 and push it clear of stop 82.

When package 60 is free from stop 82 it is advanced by belts 80, 80 along conveyor table 83 to clear the rear end of the package from the rear end of an opening 108 in conveyor table 83. A finger 110 is adapted to move upwardly through opening 108, engage the rear end of package 60 and advance it into position into receiver 70. FIGURE 10 shows finger 110 advancing a package 60, the advancement being close to completion.

Referring particularly to FIGURE 13–15, finger 110 is fixedly secured between blocks 111, 111 and this assembly is pivotally mounted on bracket 112 by a pin 113 passing through the center of blocks 111, 111. Pin 113 also carries a roller 114 which rides on a strip of spring metal 116 suspended by supports 116A, 116A. From the center of blocks 111, 111 the assembly of the blocks and finger 110 slope downwardly in both the forward and rearward direction as shown by the portions indicated 117 and 118 respectively and the juncture of these portions is in engagement with the underside of conveyor table 83 with the weight of the finger 110 and blocks 111 assembly being equally divided on either side of pin 113.

Bracket 112 is rotatably secured to a rod 120 which is slidably carried by bearing block 122 and has one end pivotally secured to a shaft 123 in bifurcated end 124 of a lever 125 which slides in opening 126 in block 128 which is pivoted to frame 4 at 129 to provide for both the pivoting and vertical movement of lever 125. A lever 130 is pivotally connected at 132 to lever 125 and carries a cam follower roller 134 in engagement with cam 136 which is secured to cam shaft C1. Lever 130 has a bifurcated end 138 which embraces shaft C1. An extension coil spring 140 is connected to lever 125 to cause this lever to bias lever 130 so that cam follower roller 134 will be urged into contact with cam 136.

Shaft 123 carries a pair of wheels 144, 144 which ride in a guideway formed by L-shaped members 146, 146 which are secured to the underside of conveyor table 83.

Referring now to FIGURES 1, 2, 16 and 17, a reciprocating carriage 160 is provided with wheels 162 which ride in guideways 164. Each guideway 164 is fixedly secured to a lever 166 (FIGURE 17) which in turn is pivotally secured to frame 4 at 168. Levers 166 are tied together by members 170 and 172. L-shaped lever 174 is fixedly secured at one end to member 172 and at its other end carries a cam follower roller 176 which engages a cam 178 secured to cam shaft C1.

Figure 16:
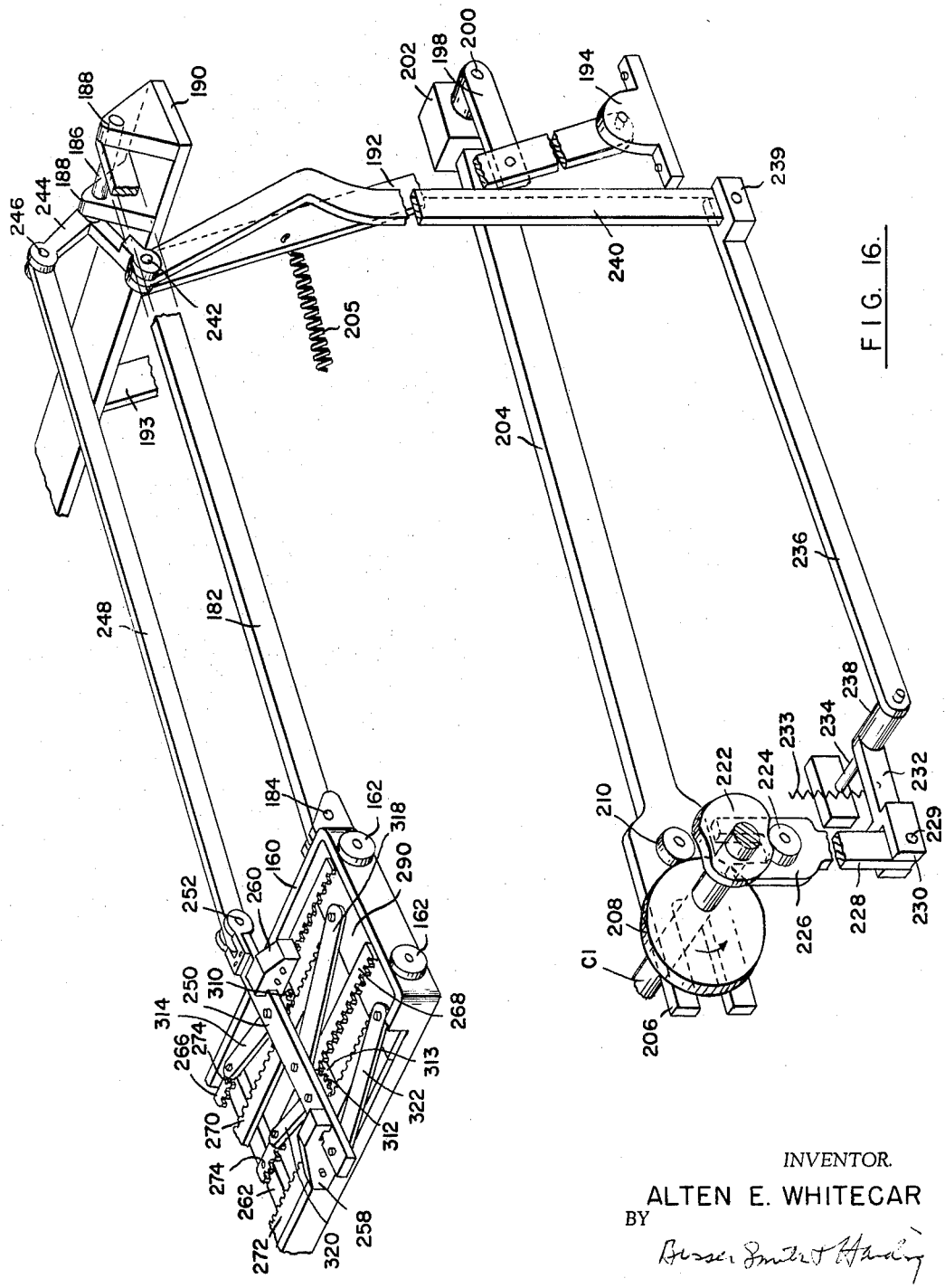
FIGURE 16 is a top perspective view showing details of the structure for operating the compression means and for reciprocating the carriage.
Figure 17:
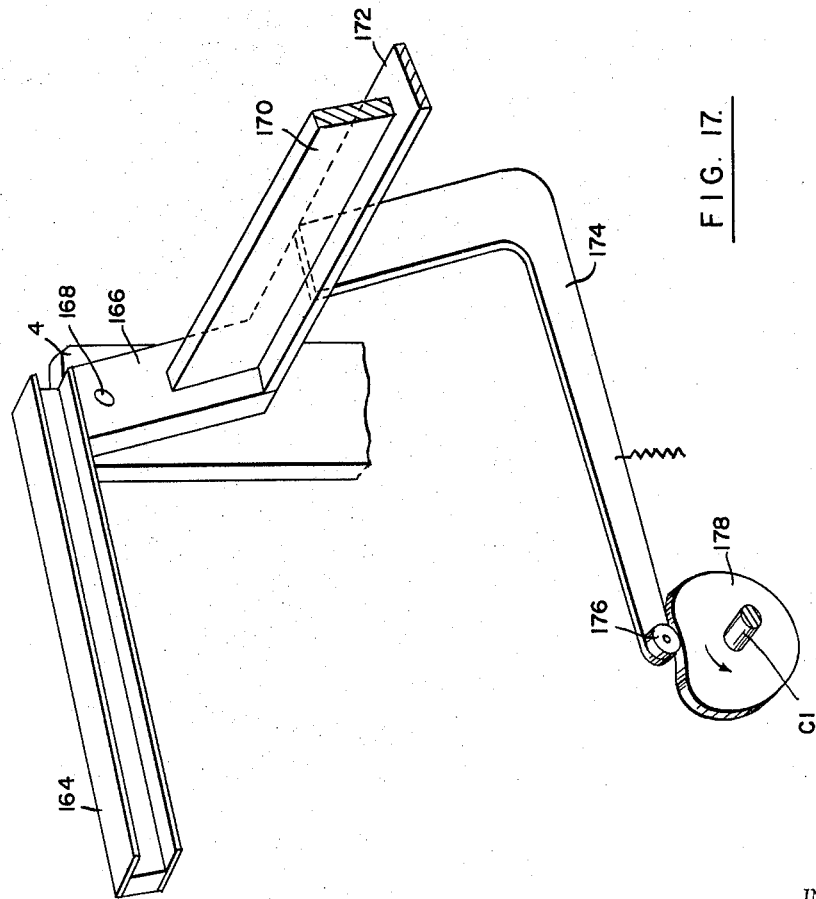
FIGURE 17 is a top perspective view partially broken away of the camming means for raising and lowering the carriage track taken in the vicinity of the spring indicated by the line 17—17 in FIGURE 8.

Referring particularly to FIGURES 1 and 16, the reciprocation of carriage 160 is accomplished by levers 182, each of which is pivotally secured to carriage 160 as shown at 184 (FIGURE 1). Each lever 182 is secured to a shaft 186 carried by bearing blocks 188, 188 secured to a cross-bar 190. Cross-bar 190 has fixedly secured thereto downwardly extending levers 192, 193 each of which is pivotally secured at its lower end as to a bracket 194. Lever 192 is fixedly secured to a lever 198 pivotally connected as indicated at 200 to a block 202 on a lever 204. Lever 204 has a bifurcated end 206 which spans cam shaft C1 to which is secured a cam 208 which engages a cam follower roller 210 on lever 204. Extension spring 205 attached to lever 192 urges the carriage forwardly.

Referring to FIGURE 16, cam shaft C1 also carries secured thereto a cam 222 which engages a cam follower roller 224 secured to the bifurcated end 226 of lever 228 which is pivotally secured at 229 to the bifurcated end 230 of lever 232 biased upwardly by a spring 233. Lever 232 is fixedly secured to shaft 234 which in turn is fixedly secured to a lever 236, a spacer 238 being placed between levers 232 and 236. Lever 236 has a bifurcated end 239 which is pivotally secured to upwardly extending lever 240 which in turn is pivotally secured at 242 to a bell crank lever 244 mounted for free rotation on shaft 186. At 246 lever 244 is pivotally connected to a lever 248 which in turn is pivotally connected to a slide bar 250 at 252. Slide bar 250 is engaged by slotted guide members 258 and 260 secured to carriage 160.

Referring now to FIGURES 1, 2 and 16 and FIGURES 5, 6 and 7, a pair of opposed jaws 262 and 264 are respectively secured to racks 266 and 268 and racks 270 and 272 by screws 274 (FIGURE 1). Racks 266, 268, 270 and 272 ride on end bars 288 and 290 secured to carriage 160. Spacer blocks 292, 294 and 296 are provided to keep the racks spaced at their ends adjacent bar 288. Idler gears 310 and 312 mounted on bar 313 (FIGURE 16) respectively engage racks 266 and 270 and 268 and 272. Racks 266 and 272 ride against frame 160.

A link 314 is pivotally connected to slide bar 250 and to extension portion 316 of rack 266. Link 318 is pivotally connected to slide bar 250 and to rack 270. Link 320 is pivotally connected to slide bar 250 and to rack 268. Link 322 is pivotally connected to slide bar 250 and to extension portion 324 of rack 272. In the position of slide bar 250 shown in FIGURE 2, the jaws 262 and 264 will be together in the package gripping position while when slide bar 250 is moved forwardly as viewed in FIGURE 1, the links 314, 318, 320 and 322 will have actuated the racks so that racks 266 and 268 will have moved to the right as viewed in FIGURE 1 while racks 270 and 272 will have moved to the left as viewed in FIGURE 1 opening the jaws 262 and 264. It will be noted that idler gears 310 and 312 both act as spacers and to smooth out the action of the jaws.

Figure 21:
FIGURE 21 is a fragmentary view showing the jaws gripping a package.

The upper and lower portions of the jaws 262 and 264 slope inwardly as shown at 262A and 262B and 264A and 264B respectively as best seen in FIGURE 21.

The reciprocation of carriage 160 causes only immaterial resultant movement of jaws 262 and 264 due to the substantially parallelogram arrangement of the levers controlling the carriage and the jaws.

Figure 2:
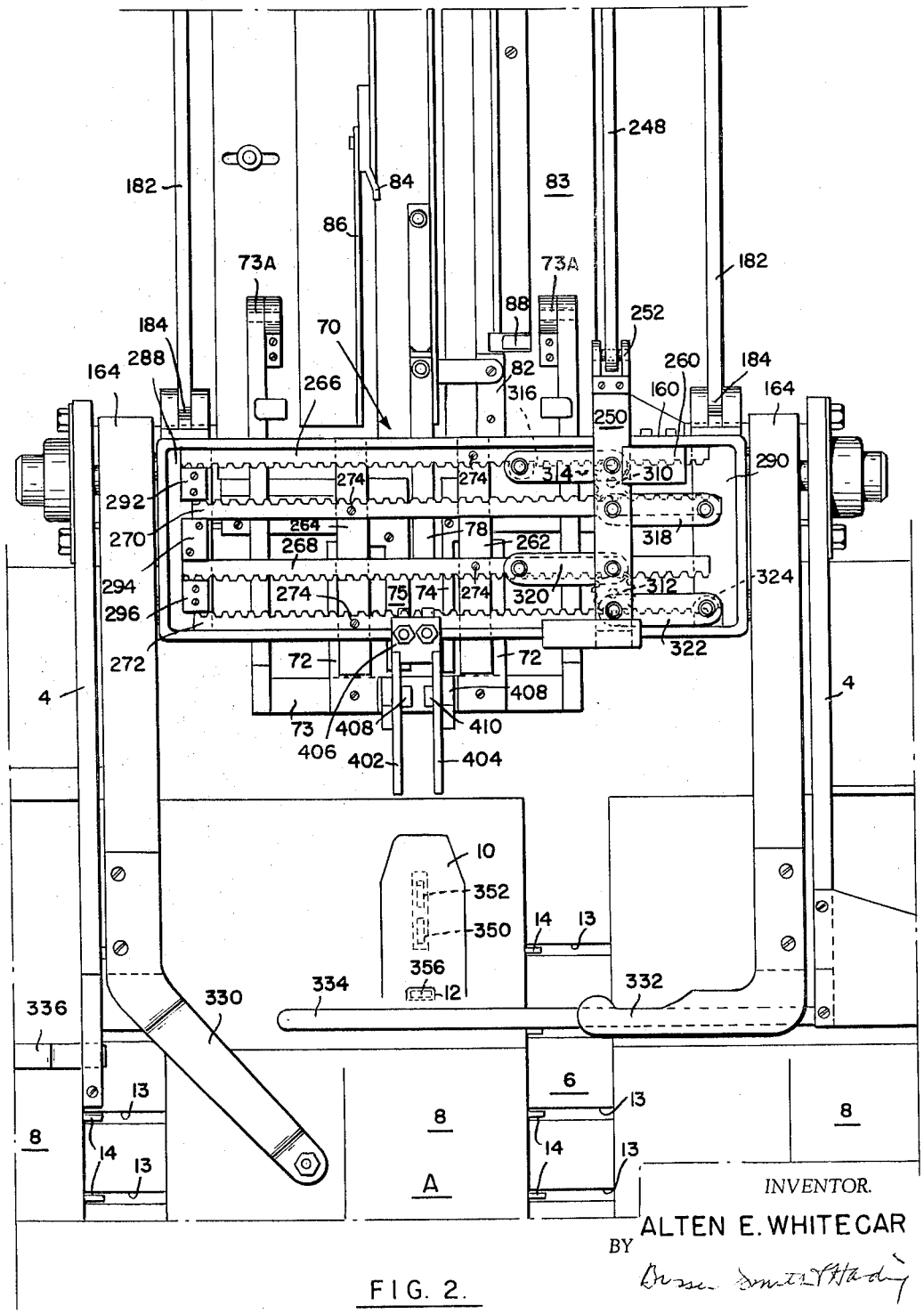
FIGURE 2 is a plan view of the machine of FIGURE 1 in which the carriage is in its rearward position with the jaws in the package gripping position.

A leaf spring hold down member 330 is secured to the left-hand guide way 164 as viewed in FIGURES 1 and 2 while a leaf spring hold down member 332 is secured to the right hand guide way 164 as viewed in FIGURES 1 and 2. Additional leaf spring hold down members 334 and 336 are secured to frame 4.

Figure 5:
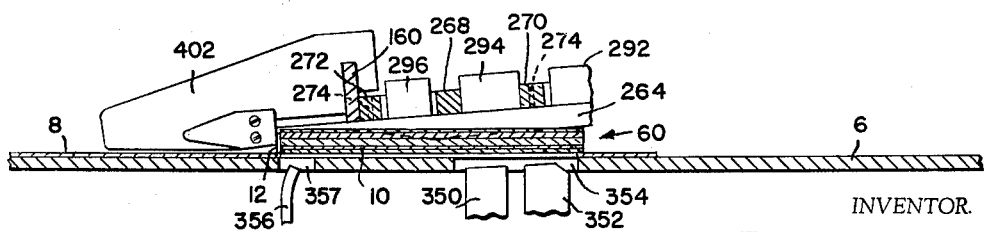
FIGURE 5 is a vertical section taken on the plane 5—5 in FIGURE 1 of the compression means for a package.
Figure 11:
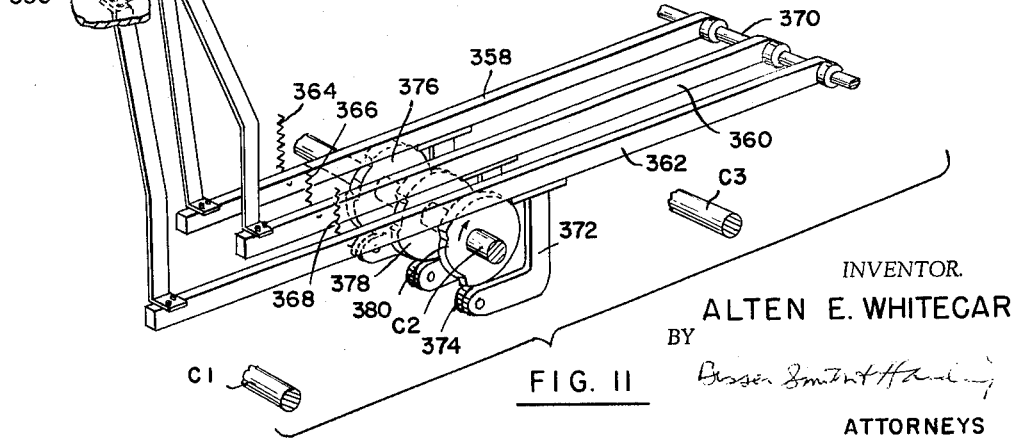
FIGURE 11 is a top perspective view partially broken away showing the tongue lifting and tab lifting apparatus of FIGURE 1.

Referring now to FIGURES 2, 5 and 11, a pair of tongue lifters 350 and 352 are adapted to extend upwardly through an opening 354 in conveying table 6. A tab lifter 356 is adapted to be extended upwardly through opening 357 in conveying surface 6. Lifters 350, 352 and tab lifter 356 are respectively connected to levers 358, 360 and 362 which are respectively biased upwardly by extension springs 364, 366 and 368 and are pivotally secured to a shaft 370. Each of the levers 358, 360 and 362 has secured thereto a downwardly extending L-shaped lever 372 carrying a cam follower roller 374 for engagement respectively with cams 376, 378 and 380 which are fixedly secured to cam shaft C2. These cams have low portions 376A, 378A and 380A, respectively.

Guides are provided to cooperate with tongue lifters 350 and 352 and tab lifter 356. Referring particularly to FIGURES 1 and 5 through 7, a pair of spaced upstanding guides 402 and 404 are secured to carriage 160 by bracket 406 and are adapted to overlie tongue 10 and back it up when it is engaged by tongue lifters 350 and 352. Guide members 408 and 410 are secured respectively to guide members 402 and 404 and are adapted to span the lifter 356 and engage tab 12 after the tab is raised into a substantially vertical position by tab lifter 356 to push it further over backwards until the end of container 60 is in position to abut against the upstanding tab when the latter is then released by guide members 408, 410.

Operation

In the operation of the above described inserting machine, the timing of the motion of the various parts in relation to the timing of conveyor fingers 14 and with respect to each other is accomplished through the proper shaping of the cams employed.

Assuming the part to be as shown in the FIGURE 1, i.e., with jaws 262 and 264 having released package 60, and taking this position to correspond to a position of zero rotation of cam shafts C1, C2 and C3, the further movement of cam 178 (FIGURE 17) urges cam follower 176 upwardly which causes lever 174 through member 172 to pivot levers 166 about pivots 168 causing guide way 164 to move to a substantially horizontal position which similarly then positions the carriage 160 in a substantially horizontal position clear of conveyor table 6. After about 25° of rotation of came shaft C1, the action of cam 208 causes carriage 160 to move rearwardly by acting on cam follower 210 and causing the rearward movement of lever 204 the pivoting of lever 192 to the right as viewed in FIGURE 16, the rearward movement of cross bar 190 and the associated lever 193 and the rearward movement of lever 182. At the end of approximately 180° of rotation of cam 208, carriage 160 reaches its most rearward position. Prior to reaching this position, jaws 262 and 264 ride over arms 72, 72 of receiver 70 causing receiver 70 to be cammed downwardly into the position shown in FIGURE 19.

With the carriage 160 in its rearmost position, cam 222 having rotated approximately 180° acts to move lever 228 downwardly which causes movement of levers 232, 236, 240 to cause bell crank 244 to pull lever 248 to the right as viewed in FIGURE 16 causing slide bar 250 through the action of links 314, 318, 320 and 322 to move respectively racks 266, 270, 268 and 272 to close jaws 262 and 264. This causes jaws 262 and 264 to engage the sides of sleeve 62 forcing the sides to be squared up and move toward each other to cause the opposite faces of the sleeve 62 to belly out away from the frame 64 as best seen in FIGURE 21, thus making room for the insertion of tongue 10 between inner lower face of sleeve 62 and frame 64. Portions 262A, 262B, 264A and 264B act to accurately center sleeve 62 (see FIGURE 21).

As carriage 160 moves forward under the urging of spring 205 as permitted by cam 208 with the carriage jaws 262 and 264 holding package 60, cam 178 permits the weight of carriage 160 to pivot guide ways 164 downwardly with levers 166 moving about pivots 168. The movement of member 172 during this pivoting through screw 77C causes bar 77 to pivot frame 76 clockwise as viewed in FIGURE 19 about shaft 76A. This causes support fingers 74 and 75 to be canted downwardly out of the way of package 60 which was correspondingly canted downwardly when guide ways 164 were pivoted.

Again, as the carriage 160 is moving forwardly towards the conveyor table 6, fingers 14 have completed the removal of the brochure 8 to which the last container 60 was attached and the placement of a fresh brochure at inserting station A. After the brochure is placed at inserting station A and after about 225° of rotation of cam shaft C2, the cam follower rollers 374, 374 associated with cams 376 and 378 are raised onto the low portions 376A and 378A of cams 376 and 378 by springs 364 and 366 to elevate tongue lifters 350 and 352 into the positions shown in FIGURE 6. At this stage, the guides 402 and 404 on carriage 160 have advanced over the leading edge of tongue 10 so that tongue lifters 350 and 352 urge the tongue 10 upwardly against these guides so as to cause tongue 10 to lie substantially in a plane parallel and below the plane of the lower face of frame 64 so that as the carriage advances further forward or to the left as viewed in FIGURE 6, tongue 10 will be inserted between the lower face of frame 64 and the bottom of sleeve 62. Shortly after the insertion of tongue 10 in this manner and as container 60 approaches tongue lifters 352 and 350 they drop in succession in that order due to the action of cams 378 and 376. Just before the withdrawal of tongue lifter 350, cam 380 is positioned so that its associated cam followers 374 can enter its low portion 380A under the urging of spring 368 which causes tab lifter 356 to be raised and bend back tab 12 to a substantially perpendicular position. Tab lifter 356 is withdrawn by the action of cam 380 just as the carriage 160 moves forwardly sufficiently to provide for the engagement of the upstanding tab 12 by guide members 408 and 410 which bend the tab over backwards until the adjacent end of container 60 is in its final position when members 408, 410 release the tab by travelling beyond it. At this juncture, the action of cam 222 causes the movement of slide bar 250 to move forwardly to the position shown in FIGURE 1 opening jaws 262 and 264 and releasing the package 60 in its position with the tongue inserted into container 60 and tab 12 abutting against one end of container 60. This completes 360° of operation of shafts C1, C2 and C3 and a complete cycle of operation of the carriage.

It still remains to describe the operation which places a container 60 into receiver 70 in position to be picked up by carriage 160. Just after jaws 262 and 264 have engaged the container 60 on receiver 70, that is, after about 190° of rotation of shaft C3, cam 102 (FIGURE 10) has its low portion 104 in contact with cam follower 100 permitting spring 98 to pivot lever 90 so as to cause finger 88 to push forward end of container 60 clear of stop 82 thus permitting conveyor belts 80, 80 to advance container 60 towards receiver 70. With reference to FIGURE 10, it will be understood that there will be another container 60 immediately behind the leading container 60 which has been released which will be carried forward to abut against stop 82. When container 60 has been advanced by belts 80, 80 so that its trailing end is clear of opening 108 in conveyor table 83 (with shaft C1 at about 15° of rotation from 0°), cam 136 (FIGURE 13) permits spring 140 to rapidly pivot lever 125 and lever 130 to the left as viewed in FIGURE 13 causing rod 120, bracket 112 and the assembly of blocks 111, 111 and lever 110 to move to the left as viewed in FIGURE 13 from the starting position shown in FIGURE 14. The frictional engagement of lever 110 and blocks 111, 111 with the underside of conveyor table 83 as these parts move to the left as viewed in FIGURE 14, causes lever 110 to pivot so as to elevate the leading end 110A which as lever 110 is continued to be moved forward engages the rear of container 60 as shown best in FIGURE 10 and moves it into its proper position in receiver 70. After package 60 is engaged by jaws 262, 264, cam 136 (after about 190° of rotation) causes the reverse movement of levers 130 and 125 against the biasing of spring 140 which causes the retraction of lever 110 below table 83 again due to the frictional engagement with conveyor table 83 causing pivoting of lever 110 so as to lower the leading edge 110A.

What is claimed is:

1. A machine for inserting a tongue into a packed open-ended container comprising an inserting station, means to convey the tongue to the inserting station, means to raise the tongue at the inserting station, inserting means, means to feed a packed open-ended container to the inserting means including a receiver for supporting the container, the inserting means comprising a reciprocable carriage reciprocating between the receiver and the inserting station, means to reciprocate the carriage, compression means mounted on the carriage, means to operate the compression means to engage the container on the receiver to belly out a face of the container away from its contents to form an opening between the container and its contents for the reception of the tongue and to hold the container as the carriage advances towards the tongue to position the tongue in said opening and to release the container after the tongue is inserted.

2. A machine in accordance with claim 1 in which the comression means comprises a pair of opposed jaws and the means to operate the compression means comprises bar members respectively connected to the jaws and a series of cam actuated levers.

3. A machine in accordance with claim 1 in which there is provided means to support the carriage as it moves towards the inserting station to cause the opening between the container and its contents to travel in the plane containing the tongue.

4. A machine in accordance with claim 1 in which there is provided means to support the carriage as it moves towards the inserting station to cause the opening between the container and its contents to travel in the plane containing the tongue and to raise the carriage after the release of the container for the retraction of the carriage.

5. A machine in accordance with claim 1 in which there is provided means to tilt the carriage after the container on the receiver has been engaged by the compression means to cause the opening between the container and its contents to travel in the plane containing the tongue and return it to its original plane after the release of the container and the receiver for supporting the container is pivotally mounted to be tilted downwardly when the carriage is tilted.

6. A machine in accordance with claim 1 in which the means to feed the container comprises a continuously moving conveyor belt for the conveyance of a series of containers, stop means to arrest the leading container, means to operate the stop means to release the leading container and means to advance the container from the conveyor into the receiver.

7. A machine in accordance with claim 6 in which the means to advance the container into the receiver comprises a pusher member and means to elevate the pusher member above the conveyor member, advance it towards the receiver behind the leading container and retract it to a position below the conveyor.

8. A machine for inserting a tongue on a sheet into a packed open-ended container and for raising a tab adjacent the tongue, an inserting station, means to convey the sheet to the inserting station, means to raise the tongue, means to raise the tab, inserting means, means to feed a packed open-ended container to the inserting means including a receiver for supporting the container, the inserting means comprising a reciprocable carriage reciprocating between the receiver and the inserting station, means to reciprocate the carriage, compression means mounted on the carriage, means to operate the compression means to engage the container on the receiver to belly out a face of the container away from its contents to form an opening between the container and its contents for the reception of the tongue and to hold the container as the carriage advances towards the tongue to position the tongue in said opening and to release the container after the tongue is inserted.

9. A machine for inserting a tongue into a packed open-ended container comprising an inserting station, means to convey the tongue to the inserting station, a tongue lifter, means to elevate the tongue lifter to raise the tongue and to lower the tongue lifter clear of an advancing container, inserting means, means to feed a packed open-ended container to the inserting means including a receiver for supporting the container, the inserting means comprising a reciprocable carriage reciprocating between the receiver and the inserting station, means to reciprocate the carriage, guide means on the carriage to back up the tongue raised by said tongue lifter, compression means mounted on the carriage, means to operate the compression means to engage the container on the receiver to belly out a face of the container away from its contents to form an opening between the container and its contents for the reception of the tongue and to hold the container as the carriage advances towards the tongue to position the tongue in said opening and to release the container after the tongue is inserted.

10. A machine for inserting a tongue on a sheet into a packed open-ended container and for raising a tab adjacent the tongue, an inserting station, means to convey the sheet to the inserting station, a tongue lifter, means to elevate the tongue lifter to raise the tongue and to lower the tongue lifter clear of an advancing container, a tab lifter, means to elevate the tab lifter to raise the tab and to lower the tab lifter clear of an advancing container, inserting means, means to feed a packed open-ended container to the inserting means including a receiver for supporting the container, the inserting means comprising a reciprocable carriage reciprocating between the receiver and the inserting station, means to reciprocate the carriage, guide means on the carriage to back up the tongue raised by said tongue lifter, tab engaging means on said carriage to carry the tab away from the tab lifter and retain it until the tongue is substantially fully inserted in the container, compression means mounted on the carriage, means to operate the compression means to engage the container on the receiver to belly out a face of the container away from its contents to form an opening between the container and its contents for the reception of the tongue and to hold the container as the carriage advances towards the tongue to position the tongue in said opening and to release the container after the tongue is inserted.

11. A machine for inserting a tongue into an open-ended container comprising an inserting station having a supporting surface adapted to support a tongue, means to raise the tongue at an angle to the supporting surface, inserting means comprising a reciprocable carriage, means to reciprocate the carriage from the inserting station to a point spaced from the inserting station, compression means mounted on the carriage, means to operate the compression means to engage an open-ended container at said point spaced from the inserting station to open up an open end of the container to form an opening for the reception of the tongue, to hold the container as the carriage advances towards the tongue to position the tongue in said opening and to release the container after the tongue is inserted.

12. A machine in accordance with claim 11 in which the compression means comprises a pair of opposed jaws and the means to operate the compression means comprises bar members respectively connected to the jaws and a series of cam actuated levers.

13. A machine in accordance with claim 11 in which there is provided means to support the carriage as it moves towards the inserting station to cause the opening between the container and its contents to travel in the plane containing the tongue.

14. A machine in accordance with claim 11 in which there is provided means to support the carriage as it moves towards the inserting station to cause the opening between the container and its contents to travel in the plane containing the tongue and to raise the carriage after the release of the container for the retraction of the carriage.

References Cited by the Examiner
UNITED STATES PATENTS 1,881,845   10/1932   Morris _____ 53—50

TRAVIS S. McGEHEE, *Primary Examiner.*